March 24, 1936.    F. L. DYER    2,034,943
TIME RECORDING TALKING MACHINE
Filed Feb. 17, 1933    4 Sheets-Sheet 1
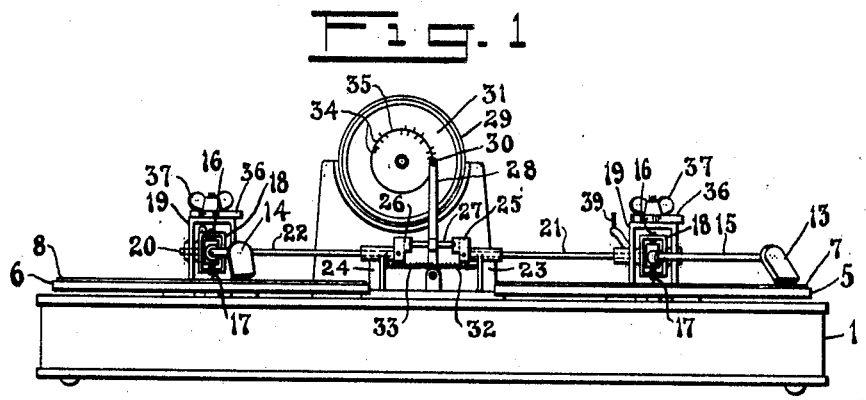
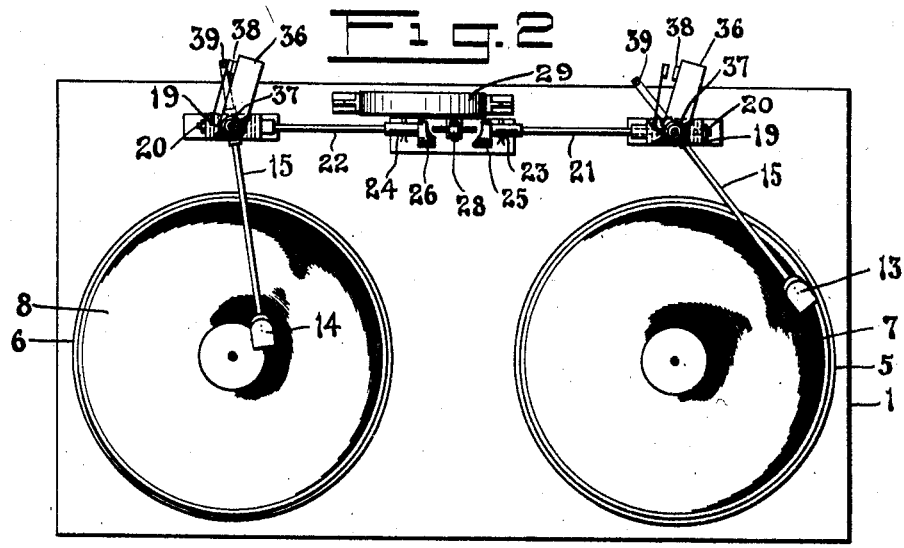
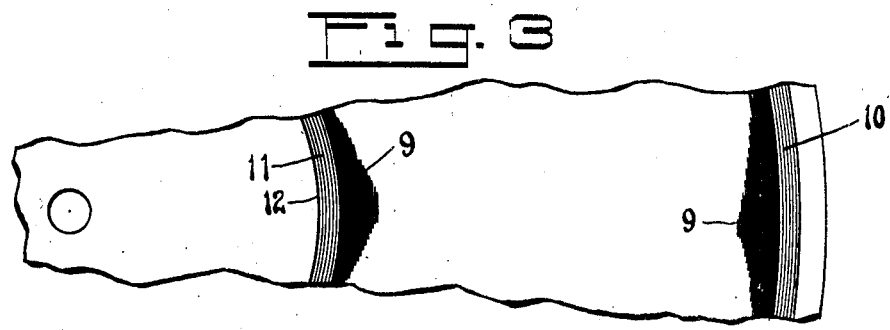
INVENTOR March 24, 1936.                F. L. DYER                   2,034,943
                     TIME RECORDING TALKING MACHINE
                        Filed Feb. 17, 1933          4 Sheets-Sheet 2
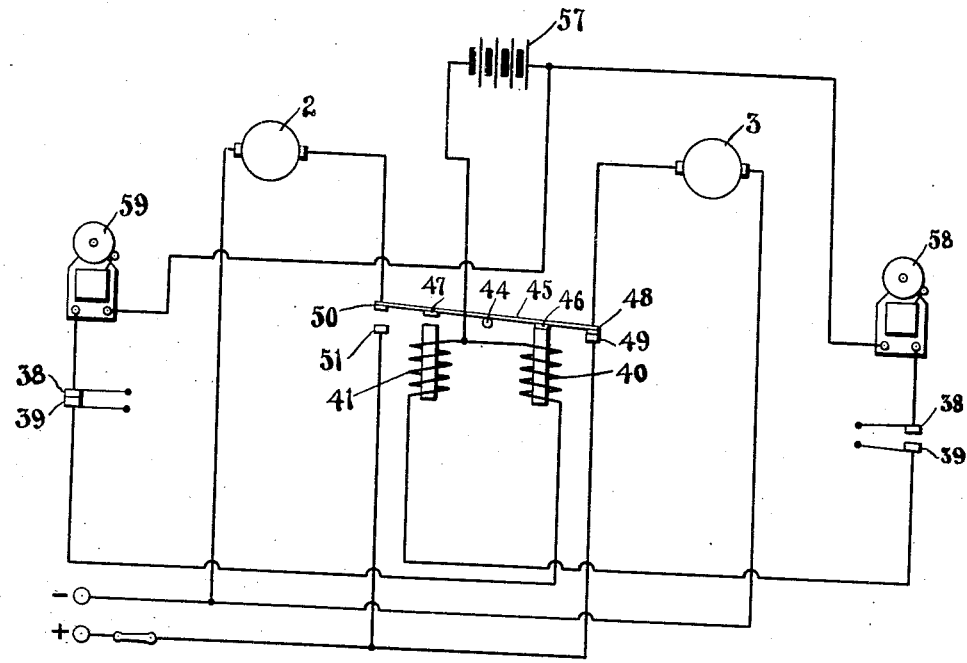
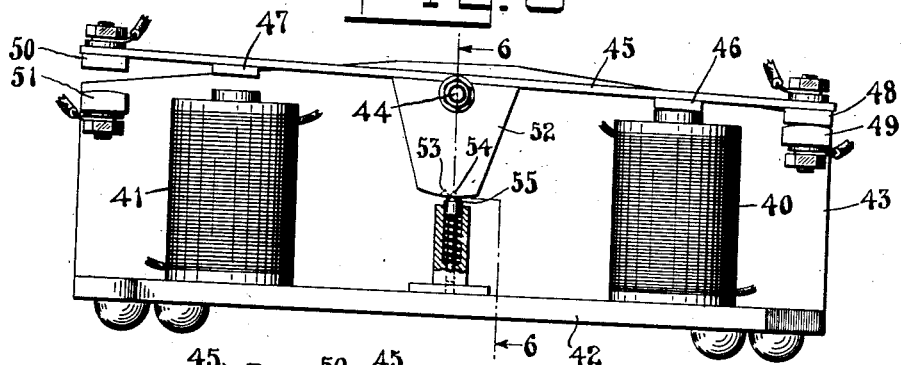
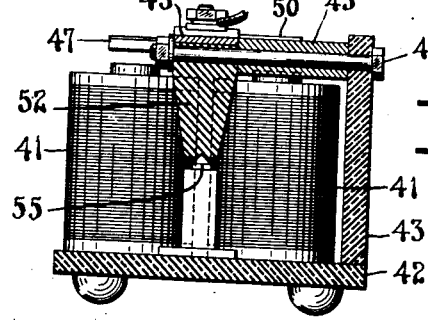
INVENTOR March 24, 1936.  F. L. DYER  2,034,943
TIME RECORDING TALKING MACHINE
Filed Feb. 17, 1933  4 Sheets-Sheet 3
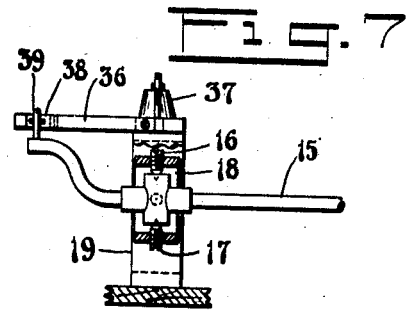
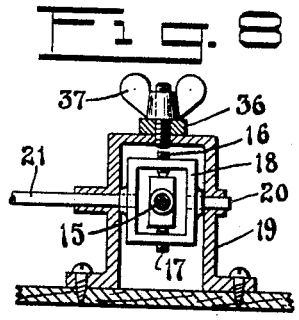
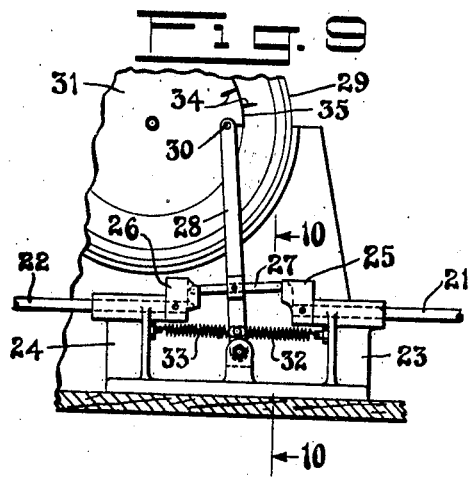
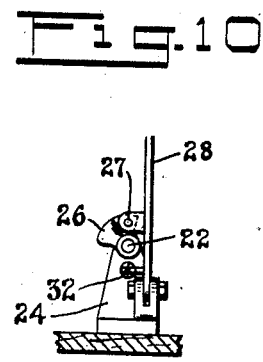
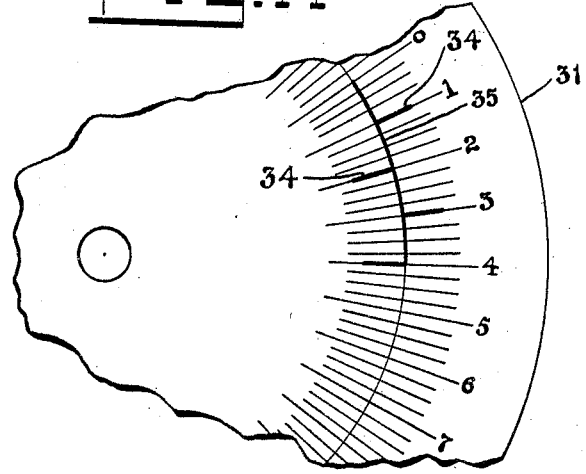
INVENTOR March 24, 1936. F. L. DYER 2,034,943
TIME RECORDING TALKING MACHINE
Filed Feb. 17, 1933 4 Sheets-Sheet 4
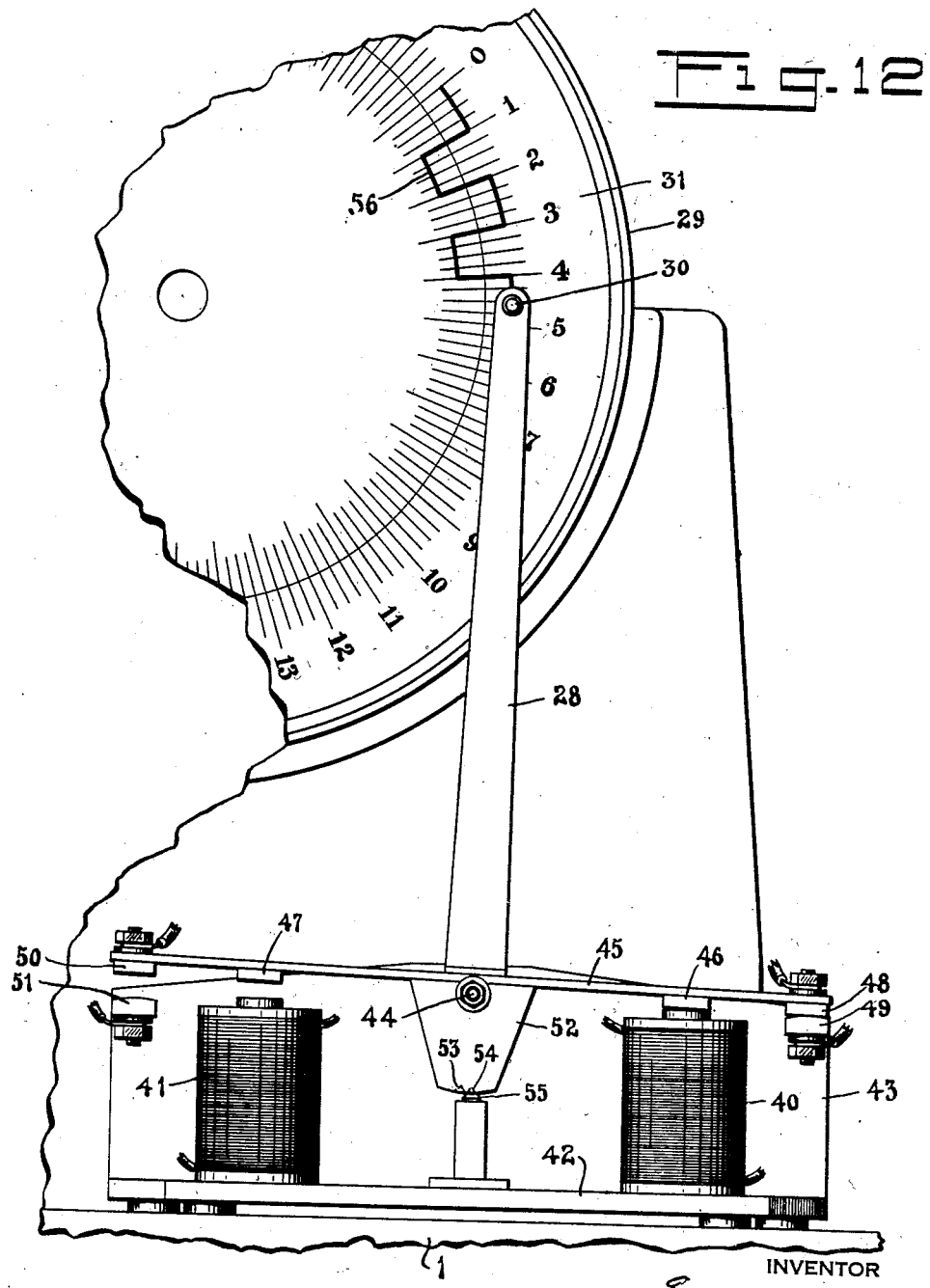
INVENTOR Patented Mar. 24, 1936

2,034,943

UNITED STATES PATENT OFFICE 2,034,943

TIME RECORDING TALKING MACHINE

Frank L. Dyer, Ventnor, N. J.

Application February 17, 1933, Serial No. 657,228

4 Claims. (Cl. 234—1)

My invention relates to an improved time recording talking machine and my object is to provide mechanism by which a permanent record will be made showing the number of times the machine is operated in a given period and preferably also indicating the time of each operation.

There are instances where is is desirable to make a record of this sort. For example, it has been proposed to make use of record disks, preferably of the long playing type for advertising purposes. Such records will be played in a store or other commercial establishment and will contain a suitable program of music or other form of entertainment together with advertising announcements of special goods, which the manufacturer thereof wishes to bring to the attention of the public. Such records will be played daily at specified times usually when trade is brisk.

The one or more advertisers manufacturing the goods which are thus advertised will supply the required machines to the establishments in which they are played as well as a change of records from time to time. While as a matter of self-interest the proprietor of the store selling the goods might be expected to operate the talking machine in the prescribed manner, it is desirable that the advertiser or advertisers should be assured that this is actually done.

It might be possible by means of automatic mechanism to start the talking machine in operation at the desired time of day and stop it at the end of the operating period and so on from day to day, but such an expedient would involve the use of expensive apparatus for stopping the talking machine at the end of the record, returning the tone arm to the beginning of the record and again starting the talking machine in operation. Besides mechanism of automatic type is uncertain and likely to get out of order and if it involves the use of a spring wound clock there is always the likelihood of the storekeeper failing to keep it wound.

What I propose to do is to provide simple and effective mechanism by which a permanent record will be made indicating graphically that the talking machine has been operated in the desired periods. Such a record might desirably provide a graphic indication for an entire week and after removal the record can be forwarded to the agency representing the advertiser or advertisers. In this way an effective check may be kept upon thousands of stores if necessary with assurance that the machines therein have been properly operated.

In carrying my invention into effect I preferably make use of two turntables driven preferably by separate motors and I provide for the automatic starting of one of these turntables when the record on the other turntable has reached its end. The records can, of course, operate sound boxes so that the sounds will be directly reproduced through horns as with old fashioned phonographs, but I prefer to make use of electrical pick-ups so that the recorded sounds will be converted into telephone currents which in turn will be amplified by thermionic tubes and cause to operate one or more loud speakers of any suitable type placed in desired locations in the store.

I propose to place the talking machine having the two turntables in the cashier's cage, since the manual operations can be performed in a few seconds and will not interfere with the regular duties of the cashier. Obviously however, the talking machine may be placed elsewhere.

A desirable arrangement would involve the use of a thirty minute record, one on each turntable, giving a complete program of an hour's duration and offering plenty of opportunity for considerable interspersed advertising matter.

At the commencement of the operation the cashier or other operator will engage the pick-up stylus at the beginning of each of the two records and will then start the turntable carrying the first record of the program which will then play for a period of say thirty minutes. Upon the completion of the first record the second turntable will start automatically to complete the second half of the program.

Preferably upon the completion of each record there will be a signal which will indicate to the cashier or other operator that the record has completed its part of the program and has come to a stop, whereupon the pick-up or tone arm will be raised and the stylus moved back again to the commencement of the record which has just been played, ready to be automatically started upon the completion of the playing of the other record.

This signal may be of any suitable kind, such as a bell to give an audible indication or an annunciator drop to give a visual indication.

Combined with the turntables I employ a spring operated time recorder of any suitable type. With these recorders which are employed for example in recording graphically changes in temperature or variations in steam pressure a circular card is used which for my purpose will make a complete revolution in six days. The card will be marked with the days of the week and with the hours of the day.

Engaging the card there is a pen or pencil which (with one form of my invention) if not diverted from its path will trace a circular line on the card and will at all times coincide with the actual time indicated on the card. The pen or pencil of the recorder may be so connected with the two tone arms that when either is lifted so as to move the stylus back to the starting point, the pen or pencil will be shifted sidewise, to thus make a break or peak in the circular line, and in this way indicate the exact hour and minute of the day when this shifting operation has been performed. With this form of my invention, (when two turntables are used) the mechanism will be so arranged that when the stylus of one record has been moved to the starting point, the break in the recorded line would extend in one direction while the return movement of the stylus of the other record will cause the break to be formed in the other direction. Of course, these so-called breaks are in no way similar to the slow peaks which are formed, for example, on a recording thermometer but are mere lines to the right or left since the shifting of the stylus is effected in one or two seconds.

Preferably my improved apparatus involves the use of two relays controlling two sets of motor contacts for the driving motors. When one relay operates it closes one set of motor contacts so as to start the corresponding motor and opens the other set to permit the other motor to come to rest.

Contacts are employed in connection with each turntable adapted to be closed by the movement of the tone arm or pick-up arm when the latter has reached the end of its travel. The contacts at one turntable close the circuits for operating the motor controlling relay of the other turntable and vice versa.

Provision is made whereby the position of the two sets of contacts may be adjusted according to the length of the record to be played as will be more fully hereinafter explained.

Instead of operating the pen or pencil of the recorder by the lifting movement of the tone arm or pick-up arm as above referred to, a somewhat simpler and on the whole a preferable arrangement is secured if the pen or pencil is actuated directly by the relays referred to. Thus, if there is a single pivoted arm carrying an armature at each end for operation by either relay, the pencil or pen may be operated from said arm when either of the relays is energized. In this case instead of forming a graphic record comprising a circular path with breaks to the right or left, a zigzag record will be formed which will indicate the number of operations of each record as well as the time of day at which each change from one disk to the other was made.

Preferably the disks used are of a special type. The sound portion of the record will preferably be of fine pitch, say two hundred threads more or less to the inch and at the beginning of the sound record there will be a few turns of a relatively coarse guiding groove of say fifty threads per inch which will lead the stylus into the fine record groove. A coarse guiding groove will in this way permit the stylus to be more accurately engaged by the record and will allow the disk to make a number of turns before the record groove is reached. In this way the motor will be able to attain the desired operating speed before sounds are reproduced.

At the end of the sound groove there will be another relatively coarse spiral thread leading to a deep concentric groove, thus permitting the tone arm or pick-up arm to move at first laterally after playing to close the contacts which affect the starting of the other disk. By employing a concentric groove the swinging movement of the tone arm or pick-up arm will be arrested after the contacts have been closed.

It will of course be understood that instead of using a pair of turntables, a single turntable may be employed, carrying only one disk. This will of course cut the playing time of the program in half. When only a single record is used, mechanism for controlling the second record may be dispensed with since the motor of the single turntable may operate continuously. Having made a graphic record as described the card will indicate the exact minute of the day for an entire week at which the tone arm or pick-up arm of the record or records was shifted, and thus graphically indicate to the advertising agency that the talking machine was properly operated.

While I have indicated in a general way the equipment used and the operation of my improved time recording talking machine when employed in the distribution of a combined entertainment and advertising program it will be understood that the apparatus may be made use of in any connection where it is desirable that a record should be made which indicates the operation of the talking machine at stated periods, as for example, with radio broadcasting.

In order that my invention may be better understood attention is directed to the accompanying drawings forming a part of this specification showing an apparatus equipped with two turntables and in which Figure 1 is an end elevation of an apparatus employing two turntables showing an electric pick-up for each disk and illustrating the form of the invention in which the recording pencil or pen is actuated by the lifting movement of either pick-up as it is returned to the commencement of a record which has just been played.

Figure 2 is a plan view of the same.

Figure 3 is a plan view of the preferred form of disk illustrating coarse threaded spiral guiding grooves at the beginning and end of the sound groove.

Figure 4 is a diagram of the preferred electric circuits employing audible signals.

Fgure 5 is a front view of the relay employed for controlling two motors.

Figure 6 is a sectional view on the line 6—6 of Figure 5.

Figure 7 is an enlarged cross-sectional view of the pivoted end for one of the pick-up arms shown in Figures 1 and 2 on a somewhat larger scale and illustrating a suitable contact arrangement for controlling the relays.

Figure 8 is a cross sectional view on the same scale as Figure 7 taken at right angles thereto.

Figure 9 is a fragmentary view illustrating the time recorder and the arrangement used for actuating the same by the lifting of the tone arm or pick-up arm.

Figure 10 is a section on the line 10—10 of Figure 9.

Figure 11 is a separate view of the time recorder card showing breaks to the right or left as will be formed with the apparatus of Figures 1 and 2, and 7 to 10 inclusive and Figure 12 is a front elevation of the arrangement where the pen or pencil of the time recorder is operated directly from the pivoted relay lever, this being the preferred form of my invention.

In all of the above views corresponding parts are represented by the same reference numerals.

Referring first to Figures 1 and 2, the numeral 1 represents a suitable casing within which are mounted two electric motors shown at 2 and 3 in Figure 4. One of these motors drives a turntable 5 and the other motor a turntable 6. The turntable 5 carries a talking machine record 7 and the turntable 6 a talking machine record 8, both of which are preferably of the long playing type as disclosed in my Patents No. 1,570,297 of January 19, 1926 and No. 1,628,658, of May 17, 1927.

For the purpose of store advertising, the sound record portion of each disk may conveniently play for thirty minutes so as to give a program running for an hour. By making these disks double-faced it is obvious that a second program of equal duration can be played. Preferably these disks are of an especial character as shown in Figure 3.

The sound groove 9 is preferably closely spaced, say 200 or more threads per inch and the disk turns at relatively slow speed, say 33½ R. P. M. with a 12 inch disk. At the beginning of the fine record 9 I preferably form a coarse spiral groove 10 which leads into the fine record groove and which may be of the order of 50 threads per inch. By reason of the presence of this preliminary guiding groove it is not necessary for the operator to take pains in engaging the needle with the beginning of the sound groove. The needle may be engaged at any portion of the guiding groove 10 so that before the record begins to play there may be a few seconds of silence. At the end of the fine sound groove 9 there is a second coarse spiral guiding groove 11 leading from the record groove so that at the completion of the playing, the tone arm or pick-up arm will swing more rapidly in the direction in which it has been moving to bring about the closing of the appropriate relay contacts as will be hereinafter described.

The coarse groove 11 leads into a deep concentric groove 12 so that after contact has been made further lateral movement of the needle would be arrested.

In Figures 1 and 2 light weight electrical pick-ups 13 and 14 are shown either of the hill and dale or lateral type according to the character of the sound groove 9. One of the pick-up arms 15 is shown in Figures 7 and 8 and is mounted between pivots 16 and 17 in a frame 18 so as to be capable of lateral movement in playing the record. The frame 18 of each pick-up is mounted in a casing 19 on shafts 20 and 21 or 22 as the case may be so as to permit the pick-up arm to be lifted when the needle is to be moved back to the commencement of the record.

In Figure 9 I illustrate the shaft 21 of one pick-up and also a corresponding shaft 22 of the other pick-up. These two shafts 21 and 22 are carried by bearings 23 and 24 and are provided at their ends with cams 25 and 26. These cams actuate a pin 27 on a lever 28 of a time recorder 29 of any suitable type. The lever 28 carries at its upper end a pencil or pen 30 which marks a line on the card 31 of the time recorder. The card 31 is shown more clearly in Figure 11 and may conveniently indicate the operations taking place over a period of six days.

Under normal conditions, that is to say, when both needles are in engagement with their respective disks, one playing and the other being idle, the arm 28 will occupy a midway position between the cams 25 and 26 brought about for example by centering springs 32 and 33. When, however, one or the other of the pick-up arms is raised to move the pick-up back to the commencement of the record a break such as 34 will be formed in the line 35 which will be normally traced. When one pick-up is raised, the break 34 is formed at one side of the line 35 and when the other pick-up arm is raised the break 34 is formed in the opposite direction as will be seen in Figure 11. The card 31 is marked with lines indicating hours and days as shown so that a graphic indication will be given of the time when a pick-up after having played a record will be moved back to the starting point.

Mounted upon the casing 19 on a pivot in line with pivots 16, 17, is an insulated arm 36 the position of which may be adjusted and thereafter clamped by a thumb nut 37. Each of these insulated arms carries a contact 38 with which a contact pin 39 carried by and insulated from the rear end of either tone arm is adapted to engage. These contacts are shown diagrammatically in Figure 4.

By engaging the needle of either pick-up with the corresponding concentric groove 12 of its record and then by bringing the two contacts 38 and 39 together and tightening the thumb nut 37 a proper adjustment will be secured, permitting the operation of the relays regardless of the space occupied on any particular disk by the several grooves thereon.

When either pick-up arm is moved to its full lateral extent to engage the contacts 38 and 39 a circuit is closed to one relay which controls the motor for the other disk and starts it in operation. In other words, after the completion of the playing of either disk the other disk is automatically started.

A suitable relay arrangement is shown in Figure 5 and comprises two pairs of coils 40 and 41 for the two motors. These coils are carried on base 42 having a supporting back or panel 43. Mounted upon a pivot 44 projecting from panel 43 is an arm 45 which carries armatures 46 and 47 for the two sets of relay coils 40 and 41. By energizing the coils 40, as shown in Figure 5, the armature 46 will be moved slightly clockwise and by energizing the coils 41 the armature 47 will be moved slightly anti-clockwise. Carried upon one end of the lever 45 is a motor contact 48 cooperating with a stationary motor contact 49 carried by the panel 43. Similar motor contacts 50 and 51 are at the opposite end of the lever 45. An arm 52 is shown as projecting downwardly from the lever 45 and carries two notches 53 and 54 with which a spring pressed pin 55 cooperates so as to hold the motor contacts 48 and 49 or 50 and 51 in engagement during the operation of either motor.

Instead of the arrangement shown in Figures 1 and 2 and 7 to 11 inclusive, I prefer to employ the arrangement of Figure 12 owing to its simplicity. Here the arm 28 is carried directly by the lever 45 so that the pen or pencil will trace a zigzag line 56 as shown, thus indicating the periods during which either motor may be in operation.

Referring to Figure 4 I show the motors 2 and 3 connected in multiple across a power line, the motor 2 being controlled by the contacts 50 and 51 and the motor 3 by the contacts 48 and 49.

In this view the contacts 38 and 39 at the left correspond to motor 2 and are shown as being closed owing to the fact that motor 2 has operated its disk to the end of travel of the corresponding pick-up arm. This has actuated the coils 40 of the relay closing the motor contacts 48 and 49 and starting the motor 3 for playing the other disk. As soon as the pick-up arm at the left is raised and moved back to the starting point, the relay contacts 38 and 39 will be opened but the motor contacts 48 and 49 will remain closed until the motor 3 has operated its disk to the end, and the contacts 38 and 39 are then closed to energize the coils 41 and thus start the motor 2. For purposes of operating the relay coils, I have shown a storage battery 57 of comparatively low voltage but obviously any other source of power can be utilized. I also show in Figure 4 two bells 58 and 59 in series with the two sets of relay contacts so that when either set is closed the corresponding bell will ring indicating to the operator that the record has been played.

It will be seen that when either bell is rung to indicate to the operator that one or the other of the records has been played, it will stop ringing the moment the tone arm is raised to move the needle back to the commencement of the record. This return movement of the tone arm opens the bell circuit at either of the relay contacts 38 and 39.

As I have heretofore indicated, it is not necessary to use two turntables for playing two records in succession. A single turntable may be used in which case the motor 2 or 3 may operate continuously, thus doing away with the motor contacts 48, 49 and 50, 51. If the arrangement for actuating the time recorder shown in Figures 1, and 2 and 7 to 11 is employed, the only function of the relay circuit will be to ring the signal bell to indicate that the record has been played. In this case the relay will be unnecessary and a single shaft 20 or 21 will actuate the pen or pencil of the time recorder when the tone arm or pick-up arm is raised to be moved back to the starting position.

When the arrangement of Figure 12 is used with a single turntable, one of the sets of coils 40 or 41 will be retained for the sole purpose of actuating the time recorder when the relay circuit is closed.

Having now described my invention what I claim as new therein and desire to secure by Letters Patent is as follows:

1. The combination with a talking machine, a record therefor and a stylus tracking said record and reproducing therefrom, of a time operated record card, a marking device tracing a line on said card and mechanism between said stylus and said marking device under the control of said stylus whereby when the stylus has completed the tracing of the sound record a deviation will be formed in said line.

2. The combination with a talking machine, a record therefor and a stylus tracking said record and reproducing therefrom, of a time driven record receiving member, an element for producing a graphic record thereon and mechanism under the control of said stylus and cooperating with said last mentioned element whereby a graphic record will be made indicating the number of times said stylus has tracked said record.

3. The combination with a talking machine, a record therefor and stylus tracking said record and reproducing therefrom, of a time driven record receiving member, an element for producing a graphic record thereon and mechanism cooperating with said element and controlled by the stylus whereby when the stylus has reached the end of its travel a graphic record will be made indicating the number of times said stylus has tracked said record.

4. The combination with a talking machine, a record therefor and a stylus engaging said record, of a time driven record receiving member, an element for forming a graphic record thereon, a magnet coil controlling the latter element and a contact controlled by said stylus for energizing said coil when the record has been played thereby indicating the number of times said stylus has tracked its record.

FRANK L. DYER.